United States Patent
Yamamoto

(10) Patent No.: US 7,961,653 B2
(45) Date of Patent: Jun. 14, 2011

(54) RELAY APPARATUS AND COMMUNICATION SYSTEM

(75) Inventor: Akira Yamamoto, Yamatokoriyama (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 245 days.

(21) Appl. No.: 11/915,256

(22) PCT Filed: May 30, 2006

(86) PCT No.: PCT/JP2006/310723
§ 371 (c)(1),
(2), (4) Date: Nov. 21, 2007

(87) PCT Pub. No.: WO2006/129631
PCT Pub. Date: Dec. 7, 2006

(65) Prior Publication Data
US 2009/0015711 A1    Jan. 15, 2009

(30) Foreign Application Priority Data

May 31, 2005  (JP) .................. 2005-159191

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |
| H04H 20/71 | (2008.01) |
| H04J 3/16 | (2006.01) |
| H04J 3/22 | (2006.01) |

(52) U.S. Cl. ........ 370/261; 370/312; 370/390; 370/401; 370/422; 370/466; 340/286.02; 455/456.1; 709/208; 709/230

(58) Field of Classification Search ................. None
See application file for complete search history.

(56) References Cited

U.S. PATENT DOCUMENTS
6,266,375 B1 * 7/2001 Chang et al. ............ 375/240.03
(Continued)

FOREIGN PATENT DOCUMENTS
JP        5-216800 A      8/1993
(Continued)

OTHER PUBLICATIONS
Translation of JP 2004-266453.*
(Continued)

*Primary Examiner* — Daniel J Ryman
*Assistant Examiner* — Nishant B Divecha
(74) *Attorney, Agent, or Firm* — Birch, Stewart, Kolasch & Birch, LLP

(57) ABSTRACT

A home gateway is an apparatus that transmits information, which is received from an intercom slave unit, to a plurality of appliances each having a communication function. The home gateway includes a demultiplexing circuit, a wireless communication circuit, a memory, a video codec circuit, and a CPU. The demultiplexing circuit receives information from the intercom slave unit. The wireless communication circuit communicates with the plurality of appliances. The memory stores profiles and levels. The video codec circuit converts image information received from the intercom slave unit according to a profile and a level. The CPU controls the wireless communication circuit and the video codec circuit. Thereby, various data can be transmitted regardless of structures and performance capabilities of the appliances.

11 Claims, 15 Drawing Sheets

U.S. PATENT DOCUMENTS

| | | | |
|---|---|---|---|
| 6,343,098 B1 * | 1/2002 | Boyce | 375/240.03 |
| 6,603,774 B1 * | 8/2003 | Knappe et al. | 370/466 |
| 7,369,502 B2 * | 5/2008 | Ganesamoorthi et al. | 370/236 |
| 2003/0206238 A1 | 11/2003 | Kawai et al. | |
| 2004/0170262 A1 | 9/2004 | Ohno | |
| 2007/0042804 A1 * | 2/2007 | Ryley et al. | 455/556.1 |
| 2008/0136918 A1 * | 6/2008 | Yamazaki et al. | 348/207.1 |

FOREIGN PATENT DOCUMENTS

| | | |
|---|---|---|
| JP | 2003-078629 A | 3/2003 |
| JP | 2003-299082 A | 10/2003 |
| JP | 2003-333199 A | 11/2003 |
| JP | 2004-266453 A | 9/2004 |
| JP | 2004-289657 A | 10/2004 |

OTHER PUBLICATIONS

Translation of JP 2004-289657.*

Translation of JP 2000-224319.*

JP2000-224319.*

Translation of JP 05-216800 with publication date Aug. 27, 1993.*

\* cited by examiner

FIG.9

| PROFILE | LEVEL | TYPICAL DISPLAY SIZE | MAXIMUM NUMBER OF OBJECTS | MAXIMUM VMV BUFFER SIZE (MB) | VCV DECODING RATE (MB/sec) | MAXIMUM BIT RATE | MAXIMUM VBV BUFFER SIZE (x16384) BIT |
|---|---|---|---|---|---|---|---|
| ADVANCED ·SIMPLE | L5 | 720x576 | 4 | 1620 | 48600 | 8Mbit/s | 112 |
| | L4 | 720x576 | 4 | 792 | 23760 | 3Mbit/s | 80 |
| | L3 | CIF | 4 | 396 | 11880 | 768Mbit/s | 40 |
| | L2 | CIF | 4 | 396 | 5940 | 384Mbit/s | 40 |
| | L1 | QCIF | 4 | 99 | 2970 | 128Mbit/s | 10 |
| | L0 | QCIF | 1 | 99 | 2970 | 128Mbit/s | 10 |
| MAIN | L4 | 1920x1088 | 32 | 48960 | 498600 | 38.4Mbit/s | 380 |
| | L3 | 720x576 | 32 | 9720 | 97200 | 15Mbit/s | 160 |
| | L2 | CIF | 16 | 2376 | 23760 | 2Mbit/s | 40 |
| CORE | L2 | CIF | 16 | 2376 | 23760 | 2Mbit/s | 80 |
| | L1 | QCIF | 4 | 594 | 5940 | 384Mbit/s | 16 |
| SIMPLE ·SCALABLE | L2 | CIF | 4 | 792 | 23760 | 256Mbit/s | 40 |
| | L1 | CIF | 4 | 495 | 7425 | 128Mbit/s | 40 |
| SIMPLE | L3 | CIF | 4 | 396 | 11880 | 384Mbit/s | 40 |
| | L2 | CIF | 4 | 396 | 5940 | 128Mbit/s | 40 |
| | L1 | QCIF | 4 | 99 | 1485 | 64Mbit/s | 10 |
| | L0 | QCIF | 1 | 99 | 1485 | 64Mbit/s | 10 |

RELAY APPARATUS AND COMMUNICATION SYSTEM

TECHNICAL FIELD

The present invention relates to a relay apparatus and a communication system, and particularly to a relay apparatus and a communication system simultaneously transmitting both image and voice using not less than two carrier waves.

BACKGROUND ART

Japanese Patent Laying-Open No. 2004-289657 (Patent Document 1) discloses a video intercom system connecting one or a plurality of intercom slave units each having a camera to a home network interconnecting a plurality of home electric appliances and household equipment for exchanging data (a general-purpose appliance that cannot be directly connected to the home network is connected via a conversion interface block), characterized in that the intercom slave unit having a camera includes a control unit connected to general-purpose appliances such as a TV set, telephone, and the like via the network.

The invention disclosed in Patent Document 1 can provide flexible system configuration.

Japanese Patent Laying-Open No. 2003-078629 (Patent Document 2) discloses an intercom apparatus, including: an intercom slave unit with a camera, having a call switch used by a visitor to contact a resident, a microphone and a speaker allowing the visitor to speak with the resident, and a camera taking an image of the visitor; an intercom host unit connected with the intercom slave unit with the camera via two nonpolar analog lines and having a display unit displaying the image taken by the camera of the intercom slave unit, a microphone and a speaker allowing the resident to speak with the visitor, a data encoding/decoding unit encoding or decoding video and audio data from the intercom slave unit with the camera, a communication unit simultaneously transmitting and receiving data via a local area network, and a control unit performing data processing, communication control, and the like; and a subhost unit connected with the intercom host unit via two nonpolar analog lines and having a structure similar to the intercom host unit and thus capable of responding to the visitor.

The invention disclosed in Patent Document 2 can provide enhanced installability.

Patent Document 1: Japanese Patent Laying-Open No. 2004-289657
Patent Document 2: Japanese Patent Laying-Open No. 2003-078629

DISCLOSURE OF TEE INVENTION

Problems to be Solved by the Invention

However, the inventions disclosed in Patent Document 1 and Patent Document 2 have problems that, due to limitations in data transmission system, the connected appliances are desired to have identical structures and performance capabilities, and information that can be transmitted is limited.

The present invention has been made to solve the above-mentioned problems, and one object of the present invention is to provide a relay apparatus and a communication system capable of transmitting a variety of information regardless of structures and performance capabilities of appliances.

Means for Solving the Problems

To achieve the above object, according to an aspect of the present invention, a relay apparatus transmits information received from a first appliance having a communication function to a plurality of second appliances each having a communication function. The relay apparatus includes a first communication circuit, a second communication circuit, a storage device, a conversion circuit, and a control device. The first communication circuit receives the information from the first appliance. The second communication circuit communicates with the plurality of second appliances. The storage device stores standard information indicating a standard for an image that can be displayed, for each of the plurality of second appliances. The conversion circuit converts image information received from the first appliance according to the standard for the image. The control device controls the second communication circuit and the conversion circuit. The control device includes: means for controlling the conversion circuit such that, when the first communication circuit receives the information from the first appliance, the conversion circuit converts the image information received from the first appliance into information that can be displayed in common on the plurality of second appliances, using the standard information; means for controlling the second communication circuit such that, when the conversion circuit converts the image information received from the first appliance into the information that can be displayed in common on the plurality of second appliances, the second communication circuit transmits the image information converted by the conversion circuit to the plurality of second appliances; means for controlling the conversion circuit such that, when a response is transmitted from at least one of the plurality of second appliances, the conversion circuit converts the image information received from the first appliance using the standard information; and means for controlling the second communication circuit such that, when the conversion circuit converts the image information received from the first appliance after the response is transmitted from the at least one of the plurality of second appliances, the second communication circuit transmits the image information converted by the conversion circuit to the second appliance that has transmitted the response.

Preferably, the means for controlling the conversion circuit such that the conversion circuit converts the image information received from the first appliance described above includes means for controlling the conversion circuit such that, when a response is transmitted from at least one of the plurality of second appliances, the conversion circuit converts the image information received from the first appliance into information that can be displayed as an image on the second appliance that has transmitted the response, using the standard information.

Preferably, the storage device described above includes a device storing size information indicating a size of the image that can be displayed, as the standard information, for each of the plurality of second appliances. Preferably, the conversion circuit includes a circuit converting the image information received from the first appliance to change the size of the image. Preferably, the means for controlling the conversion circuit such that the conversion circuit converts the image information received from the first appliance includes means for controlling the conversion circuit such that, when a response is transmitted from at least one of the plurality of second appliances, the conversion circuit converts the image information received from the first appliance into information that can be displayed as an image on the second appliance that has transmitted the response, using the size information.

Preferably, the storage device described above includes a device storing code information indicating a method of encoding an image to be displayed, as the standard information, for each of the plurality of second appliances. Preferably, the conversion circuit includes a circuit converting the image information received from the first appliance to encode the image. Preferably, the means for controlling the conversion circuit such that the conversion circuit converts the image information received from the first appliance includes means for controlling the conversion circuit such that, when a response is transmitted from at least one of the plurality of second appliances, the conversion circuit converts the image information received from the first appliance into information that can be displayed as an image on the second appliance that has transmitted the response, using the code information.

Preferably, the control device described above further includes means for controlling the second communication circuit to receive the standard information from the plurality of second appliances. Preferably, the storage device includes a device storing the standard information received by the second communication circuit, for each of the plurality of second appliances. Preferably, the means for controlling the conversion circuit such that the conversion circuit converts the image information received from the first appliance includes means for controlling the conversion circuit such that, when a response is transmitted from at least one of the plurality of second appliances, the conversion circuit converts the image information received from the first appliance into information that can be displayed as an image on the second appliance that has transmitted the response, using the standard information received by the second communication circuit after the response is transmitted from the second appliance.

Preferably, the means for controlling the second communication circuit to receive the standard information described above further includes means for controlling the second communication circuit to receive the standard information from each of the plurality of second appliances.

Preferably, the control device described above further includes means for controlling the second communication circuit to receive the standard information from the plurality of second appliances after the first communication circuit receives the information from the first appliance. Preferably, the storage device includes a device storing the standard information received by the second communication circuit, for each of the plurality of second appliances. Preferably, the means for controlling the conversion circuit such that the conversion circuit converts the image information received from the first appliance includes means for controlling the conversion circuit such that, when the response is transmitted from at least one of the plurality of second appliances, the conversion circuit converts the image information received from the first appliance into information that can be displayed as an image on the second appliance that has transmitted the response, using the standard information of the second appliance that has transmitted the response in the standard information stored in the storage device.

Preferably, the control device described above further includes means for controlling the second communication circuit to receive the standard information from the plurality of second appliances before the first communication circuit receives the information from the first appliance. Preferably, the storage device includes a device storing the standard information received by the second communication circuit, for each of the plurality of second appliances. Preferably, the means for controlling the conversion circuit such that the conversion circuit converts the image information received from the first appliance includes means for controlling the conversion circuit such that, when a response is transmitted from at least one of the plurality of second appliances, the conversion circuit converts the image information received from the first appliance into information that can be displayed as an image on the second appliance that has transmitted the response, using the standard information of the second appliance that has transmitted the response in the standard information stored in the storage device.

According to another aspect of the present invention, a communication system includes a first appliance, a relay apparatus, and a plurality of second appliances. The first appliance includes a reception device and a transmission circuit. The reception device receives information representing one of an image and voice. The transmission circuit transmits the information received by the reception device. The relay apparatus includes a first communication circuit, a second communication circuit, a storage device, a conversion circuit, and a control device. The first communication circuit receives the information from the first appliance. The second communication circuit communicates with the plurality of second appliances. The storage device stores standard information indicating a standard for an image that can be displayed, for each of the plurality of second appliances. The conversion circuit converts image information received from the first appliance according to the standard for the image. The control device controls the second communication circuit and the conversion circuit. The control device includes: means for controlling the conversion circuit such that, when the first communication circuit receives the information from the first appliance, the conversion circuit converts the image information received from the first appliance into information that can be displayed in common on the plurality of second appliances, using the standard information; means for controlling the second communication circuit such that, when the conversion circuit converts the image information received from the first appliance into the information that can be displayed in common on the plurality of second appliances, the second communication circuit transmits the image information converted by the conversion circuit to the plurality of second appliances; means for controlling the conversion circuit such that, when a response is transmitted from at least one of the plurality of second appliances, the conversion circuit converts the image information received from the first appliance using the standard information; and means for controlling the second communication circuit such that, when the conversion circuit converts the image information received from the first appliance after the response is transmitted from the at least one of the plurality of second appliances, the second communication circuit transmits the image information converted by the conversion circuit to the second appliance that has transmitted the response. The second appliance includes a communication device, a control device and an output device. The communication device communicates with the relay apparatus. The control device controls the communication device to transmit information for the response to the relay apparatus. The output device outputs the information received from the relay apparatus.

Effects of the Invention

The relay apparatus and the communication system in accordance with the present invention can transmit a variety of information regardless of structures and performance capabilities of the appliances.

BRIEF DESCRIPTION OF THE DRAWINGS

FIG. 9 shows contents of profiles and levels stored in the home gateway in accordance with the first embodiment of the present invention.

DESCRIPTION OF THE REFERENCE SIGNS

Figure 1:
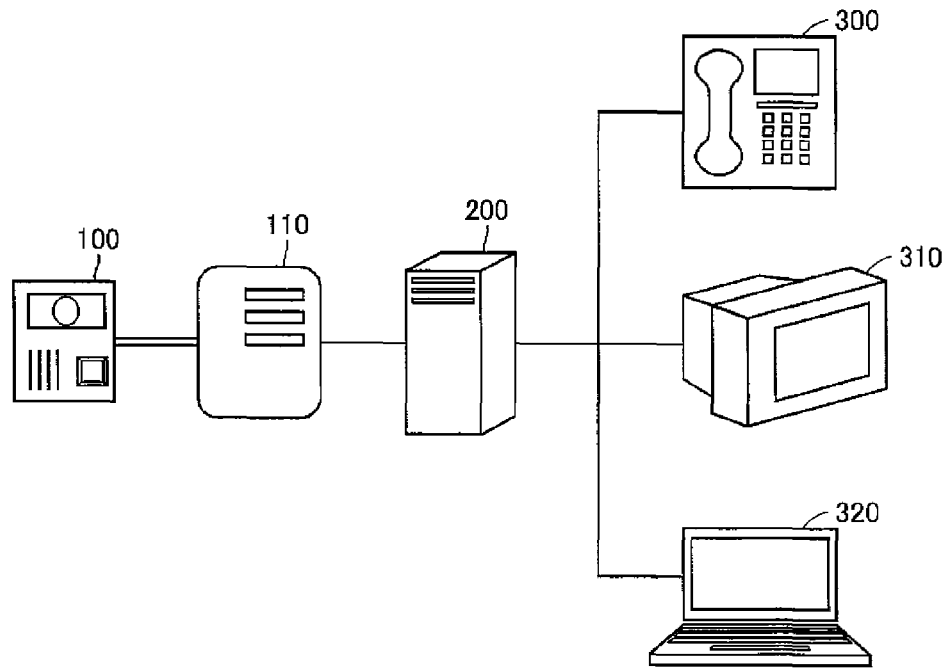
FIG. 1 shows a configuration of a communication system in accordance with a first embodiment of the present invention.

100: intercom slave unit, 101: camera unit, 102, 302, 312: speaker unit, 103, 306, 316: microphone unit, 104: call switch unit, 105: demultiplexing circuit, 106: gateway interface, 107, 221, 321: CPU, 108: video codec circuit, 109: voice codec circuit, 110: intercom adapter, 200, 600: home gateway, 201: intercom adapter interface, 202: video circuit, 203: audio circuit, 204: management device, 207: communication control circuit, 208: line circuit, 209: network interface, 210: wireless communication circuit, 222, 322: memory, 223: input device, 300: intercom host unit, 301: analog reception unit, 303, 313: extracting unit, 304, 314: display unit, 305: response unit, 307: analog transmission unit, 308, 318: control unit, 310: television set with an IP phone, 311: LAN reception unit, 315: operation unit, 317: LAN transmission unit, 319: tuner, 320: computer, 323: fixed disk, 324: keyboard, 325: display, 326: FD drive, 327: CD-ROM drive, 328: wireless LAN interface, 400: FD, 410: CD-ROM, 450: request start line, 452: header, 454: blank line, 456, 460: body.

BEST MODES FOR CARRYING OUT THE INVENTION

Hereinafter, embodiments of the present invention will be described with reference to the drawings, in which identical parts will be designated by the same reference characters. Since they are identical in names and functions, detailed description thereof will not be repeated.

First Embodiment

In the following, a relay apparatus and a communication system in accordance with a first embodiment of the present invention will be described. The communication system in accordance with the present embodiment is a video intercom system allowing a resident to speak with a visitor while watching an image of the visitor.

FIG. 1 shows a configuration of the communication system in accordance with the present embodiment. Referring to FIG. 1, the communication system in accordance with the present embodiment includes an intercom slave unit 100 having a communication function, an intercom adapter 110, a home gateway 200, an intercom host unit 300, a television set with an IP (Internet Protocol) phone 310, and a computer 320. Intercom host unit 300, television set with an IP phone 310, and computer 320 are a plurality of appliances each having a communication function. It is to be noted that, in the description below, the appliances connected to the home gateway other than intercom slave unit 100 will be simply referred to as a "plurality of appliances". Intercom slave unit 100 is connected with intercom adapter 110 via a pair of lines for communication. Intercom adapter 110 is connected to home gateway 200 via a dedicated wired line or a LAN (Local Area Network) line. Home gateway 200 is connected to intercom host unit 300, television set with an IP phone 310, and computer 320 via one of an analog line, a LAN line, and a wireless line. Intercom adapter 110 and home gateway 200 substantially operate as one relay apparatus transmitting information received from intercom slave unit 100 to intercom host unit 300, television set with an IP phone 310, and computer 320. In the present embodiment, intercom adapter 110 and home gateway 200 are separated into two apparatuses for convenience sake. Conceptually, a CPU (Central Processing Unit) 107 of intercom adapter 110 and a CPU 221 of home gateway 200 constitute one control device. It is needless to say that intercom adapter 110 and home gateway 200 can be considered as a set of relay systems. Intercom host unit 300, television set with an IP phone 310, and computer 320 can each be installed in any location. In the present embodiment, intercom host unit 300, television set with an IP phone 310, and computer 320 are installed at different locations.

Although three appliances are shown in FIG. 1 as the "plurality of appliances", the number of appliances connected to home gateway 200 is not limited thereto. Not less than four appliances may be connected to home gateway 200. Less than three appliances may be connected to home gateway 200.

Figure 2:
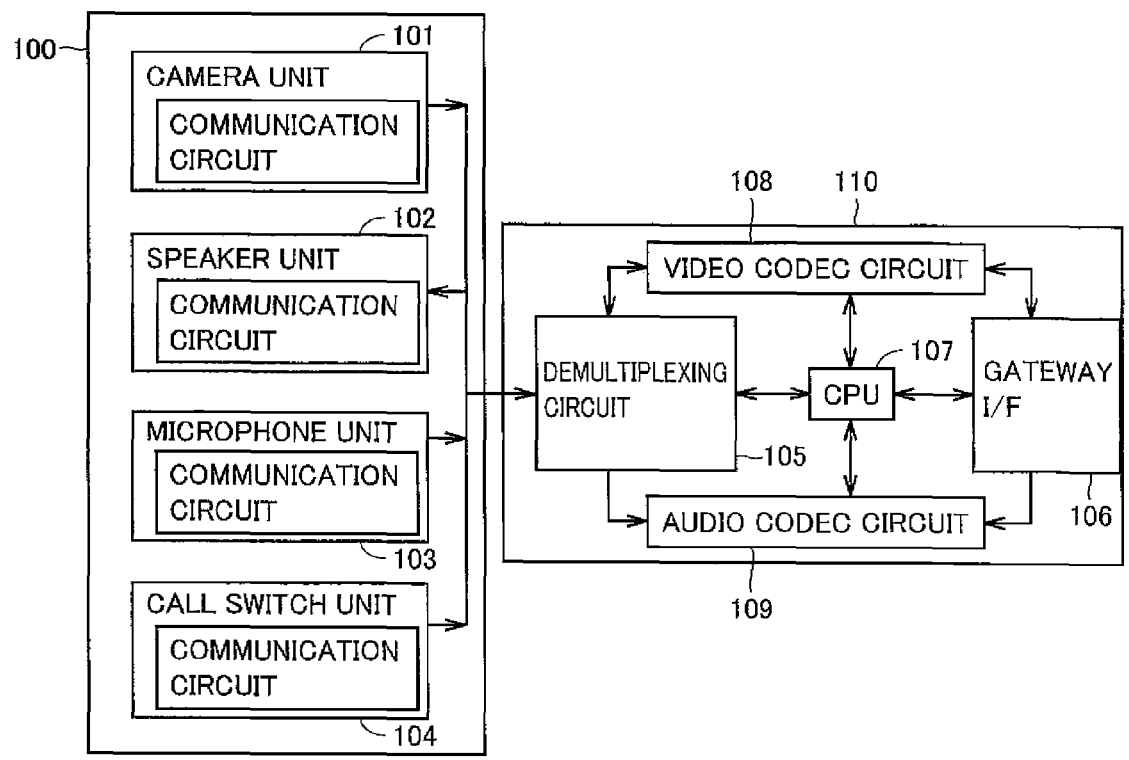
FIG. 2 is a control block diagram of an intercom slave unit and an intercom adapter in accordance with the first embodiment of the present invention.

Referring to FIG. 2, intercom slave unit 100 includes a camera unit 101, a speaker unit 102, a microphone unit 103, and a call switch unit 104. Camera unit 101 includes, for example, a solid-state image sensing device. Camera unit 101 is a device receiving information representing an image by shooting the image of a visitor. A communication circuit built in camera unit 101 transmits the information obtained by the shooting as a video signal to a demultiplexing circuit 105 of intercom adapter 110 via the pair of lines. Speaker unit 102 is a device reproducing and outputting an audio signal received by its own built-in communication circuit via the pair of lines. Microphone unit 103 is a device receiving information representing voice by converting the voice of the visitor to an electric signal. A communication circuit built in microphone unit 103 transmits the converted voice (audio) signal to demultiplexing circuit 105 of intercom adapter 110 via the pair of lines. Call switch unit 104 is a device generating a call signal in response to depression of a call button (not shown) disposed at intercom slave unit 100. A communication circuit built in call switch unit 104 transmits the call signal to demultiplexing circuit 105 of intercom adapter 110 via the pair of lines.

Referring to FIG. 2, intercom adapter 110 includes demultiplexing circuit 105, a gateway interface 106, a video codec circuit 108, an audio codec circuit 109, and CPU 107 for controlling demultiplexing circuit 105, video codec circuit 108, audio codec circuit 109, and gateway interface 106. Demultiplexing circuit 105 demultiplexes multiplexed video signal and audio signal (in some cases, video signal, audio signal, and call signal) received from intercom slave unit 100, and transmits the video signal to video codec circuit 108 and transmits the audio signal to audio codec circuit 109. Demultiplexing circuit 105 also serves as a circuit transmitting an audio signal received from home gateway 200 to speaker unit 102 of intercom slave unit 100 via the pair of lines. When a signal is multiplexed and demultiplexed, conversion from an analog signal to a digital signal, or conversion from a digital signal to an analog signal is performed. Gateway interface 106 is a device transmitting signals output from video codec circuit 108 and audio codec circuit 109 to home gateway 200. Gateway interface 106 also serves as a device outputting a signal received from home gateway 200 to demultiplexing circuit 105. Video codec circuit 108 is a circuit compressing the video signal output by demultiplexing circuit 105, using a compression technique such as MPEG4 (Moving Picture Experts Group phase 4). Compressed data is output to gateway interface 106. Video codec circuit 108 also serves as a circuit converting image information received from intercom slave unit 100 according to a standard for an image. More specifically, in the present embodiment, video codec circuit 108 serves as a "circuit converting image information received from intercom slave unit 100 to change the size of an image and encode the image". Audio codec circuit 109 is a circuit compressing the audio signal output by demultiplexing circuit 105, using a compression technique such as G.711. Compressed data is output to gateway interface 106. Audio codec circuit 109 also serves as a circuit decoding data received from gateway interface 106. The decoded data is output to demultiplexing circuit 105. Audio codec circuit 109 also serves as a circuit converting voice information received from intercom slave unit 100 according to an arbitrary standard.

Figure 3:
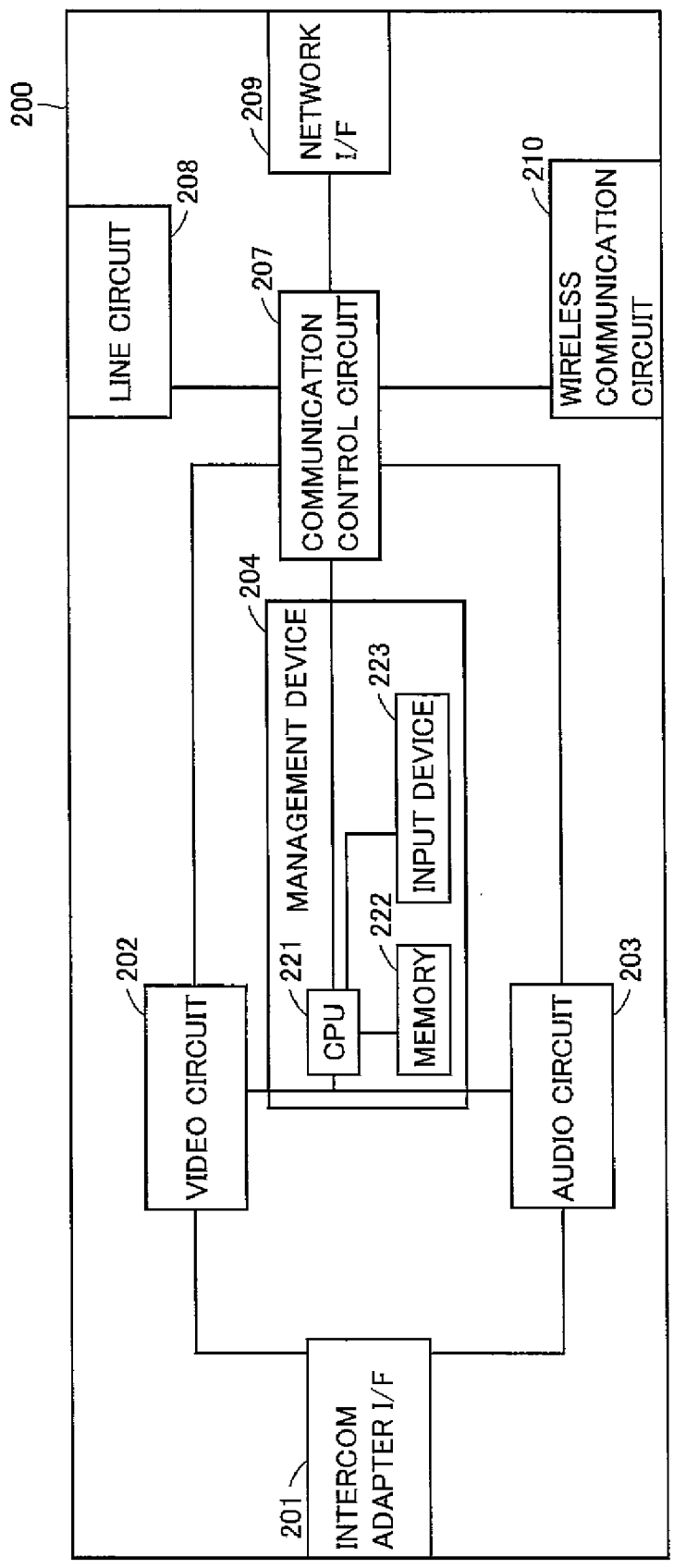
FIG. 3 is a control block diagram of a home gateway in accordance with the first embodiment of the present invention.

Referring to FIG. 3, home gateway 200 includes an intercom adapter interface 201, a video circuit 202, an audio circuit 203, a management device 204, a communication control circuit 207, a line circuit 208, a network interface 209, and a wireless communication circuit 210. Intercom adapter interface 201 is a device communicating information with intercom slave unit 100 via intercom, adapter 110. Video circuit 202 is a circuit extracting a signal representing an image from a signal output by intercom adapter interface 201. Audio circuit 203 is a circuit extracting a signal representing voice from the signal output by intercom adapter interface 201. Management device 204 is a device controlling components of home gateway 200. Management device 204 also serves as a device performing various types of processing described later. Communication control circuit 207 is a circuit transmitting a signal to each communication circuit based on the signals output by video circuit 202 and audio circuit 203. Communication control circuit 207 also serves as a circuit converting a signal output by network interface 209 into a signal that can be used inside home gateway 200. Line circuit 208 is a device individually communicating with the plurality of appliances via an analog line. Network interface 209 is a device individually communicating with the plurality of appliances via Ethernet (registered trademark). Wireless communication circuit 210 is a device individually communicating with the plurality of appliances via IEEE (the Institute of Electrical and Electronic Engineers) 802.11.

Management device 204 includes CPU 221, a memory 222, and an input device 223. CPU 221 is a device controlling communication control circuit 207, and line circuit 208, network interface 209, and wireless communication circuit 210. CPU 221 also serves as a device performing a computation necessary to fulfill the function of management device 204. Memory 222 is a device storing information used by CPU 221. The information used by CPU 221 includes a profile and a level, which are pieces of information indicating a standard for an image that can be displayed, for each of the plurality of appliances described above. As will be described later, the term "profile" refers to a type of information indicating a method of encoding an image to be displayed, and the term "level" refers to a type of information indicating a size of an image that can be displayed. Input device 223 is a device accepting an operation by a user.

Figure 4:
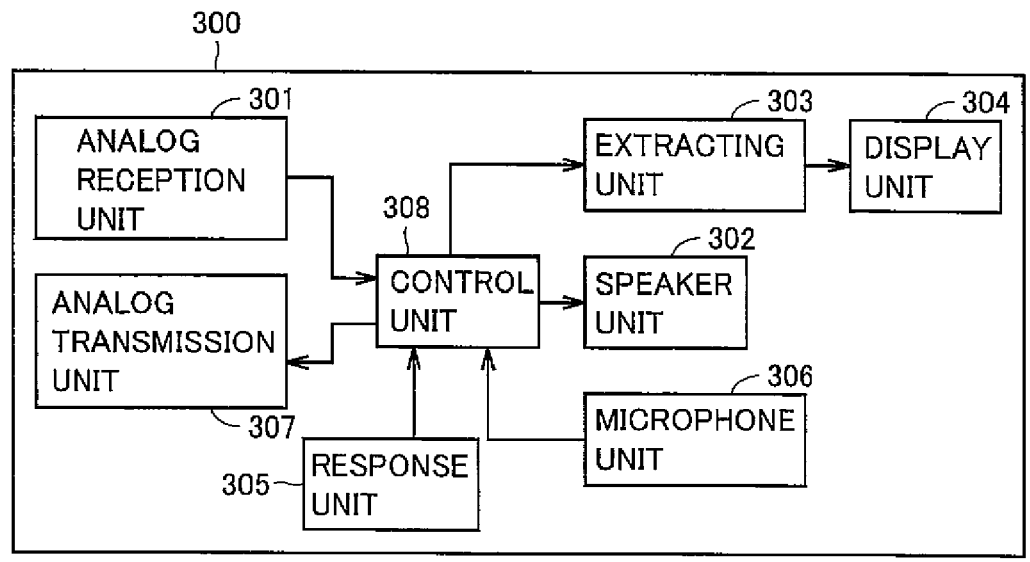
FIG. 4 is a control block diagram of an intercom host unit in accordance with the first embodiment of the present invention.

Referring to FIG. 4, intercom host unit 300 includes an analog reception unit 301, a speaker unit 302, an extracting unit 303, a display unit 304, a response unit 305, a microphone unit 306, an analog transmission unit 307, and a control unit 308. Analog reception unit 301 is a device communicating with home gateway 200 via an analog line and outputting a received signal to control unit 308. Speaker unit 302 is a device reproducing and outputting an audio signal output from control unit 308 (i.e., information received from home gateway 200). Extracting unit 303 is a device extracting a video signal output from control unit 308 and outputting the extracted video signal to display unit 304. Display unit 304 is a device outputting the information received from home gateway 200 by displaying an image based on the input video signal. Response unit 305 is a device detecting an operation by a user (for example, depression) when a call is transmitted from intercom slave unit 100, and generating a response signal and outputting the generated response signal to control unit 308. Response unit 305 also serves as a device automatically outputting information indicating a profile and a level of analog reception unit 301 to control unit 308, for communication of the profile and the level as described later. Microphone unit 306 is a device converting voice of a user into an electric signal and outputting the converted electric signal to control unit 308. Analog transmission unit 307 is a device transmitting a signal output from control unit 308 to home gateway 200 via an analog line. Control unit 308 is a device performing predetermined processing based on each of input control signals. Control unit 308 also serves as a device controlling analog transmission unit 307 to transmit information for a response to home gateway 200. Further, control unit 308 also serves as a device converting an input control signal and outputting the converted control signal to a specific component. The control signal includes information concerning a call, a response, or the like. The control signal is a signal for controlling display of an image, or transmission or reception of an audio signal.

Figure 5:
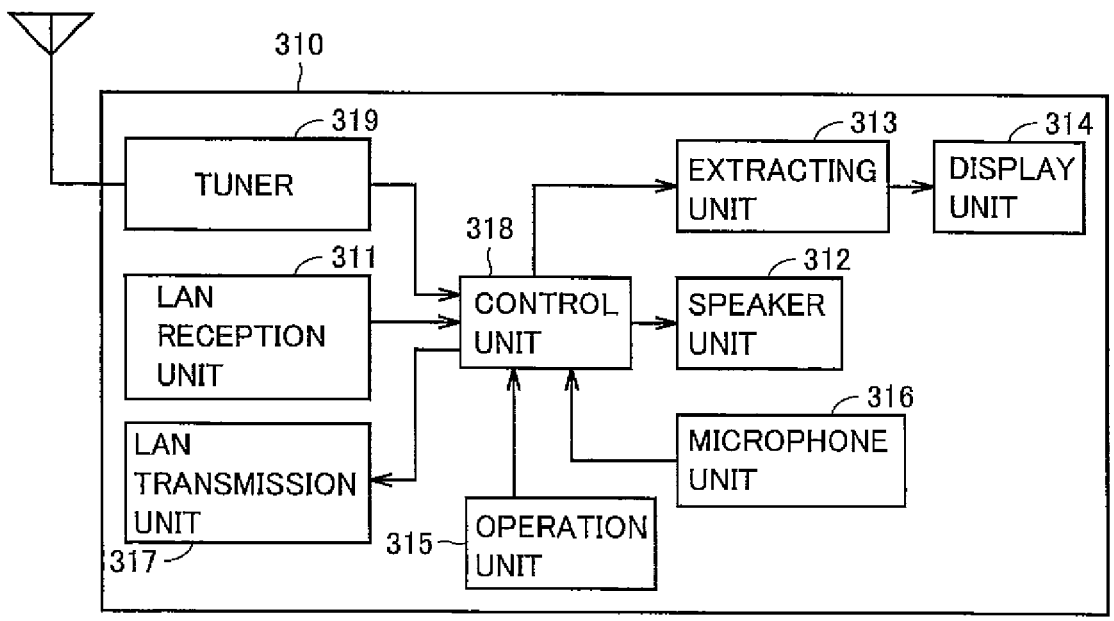
FIG. 5 is a control block diagram of a television set with an IP phone in accordance with the first embodiment of the present invention.

Referring to FIG. 5, television set with an IP phone 310 includes a LAN reception unit 311, a speaker unit 312, an extracting unit 313, a display unit 314, an operation unit 315, a microphone unit 316, a LAN transmission unit 317, a control unit 318, and a tuner 319. LAN reception unit 311 is a device wirelessly communicating with home gateway 200 via a LAN line, and outputting a received signal to control unit 318. Speaker unit 312 is a device reproducing and outputting an audio signal output from control unit 318 (i.e., information received from home gateway 200). Extracting unit 313 is a device extracting a video signal output from control unit 318 and outputting the extracted signal to display unit 314. Display unit 314 is a device outputting the information received from home gateway 200 by displaying an image based on the input video signal. Operation unit 315 is a device detecting an operation by a user (for example, depression) when a call is transmitted from intercom slave unit 100, and generating a response signal and outputting the generated response signal to control unit 318. Microphone unit 316 is a device converting voice of a user and outputting an electric signal to control unit 318. LAN transmission unit 317 is a device wirelessly transmitting a signal output from control unit 318 to home gateway 200. Control unit 318 is a device performing predetermined processing based on each of input control signals. Control unit 318 also serves as a device controlling LAN transmission unit 317 to transmit information for a response to home gateway 200. Further, control unit 318 also serves as a device converting an input control signal and outputting the converted control signal to any device constituting television set with an IP phone 310. The control signal includes information concerning a call, a response, or the like. The control signal is a signal for controlling display of an image or communication of an audio signal. Tuner 319 is a device selecting a signal of a broadcast station indicated by the response signal, from broadcast signals transmitted by broadcast stations.

Figure 6:
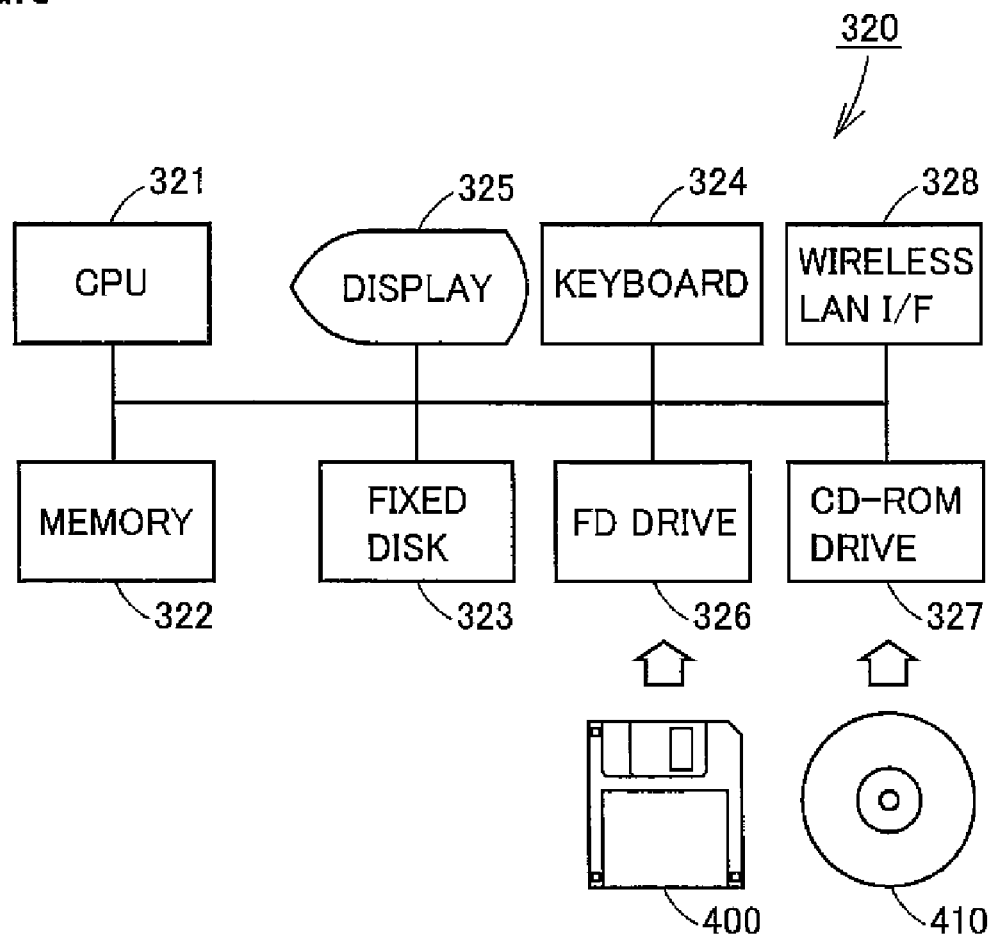
FIG. 6 is a control block diagram of a computer in accordance with the first embodiment of the present invention.

Referring to FIG. 6, computer 320 includes a CPU 321, a memory 322, a fixed disk 323, a keyboard 324, a display 325, an FD (Flexible Disk) drive 326, a CD-ROM (Compact Disk Read Only Memory) drive 327, and a wireless LAN interface 328. CPU 321 performs various computations for fulfilling the function of computer 320. CPU 321 also serves as a device controlling wireless LAN interface 328 to transmit information for a response to home gateway 200. Memory 322 is a device storing information used by CPU 321. Fixed disk 323 is a device storing information and programs. Keyboard 324 is a device accepting input by a user. Display 325 is a device displaying information received from home gateway 200 as an image. FD drive 326 is a device loading information from an FD 400, CD-ROM drive 327 is a device loading information from a CD-ROM 410. Wireless LAN interface 328 is a device wirelessly communicating with home gateway 200 and outputting a received signal to CPU 321.

Figure 7:
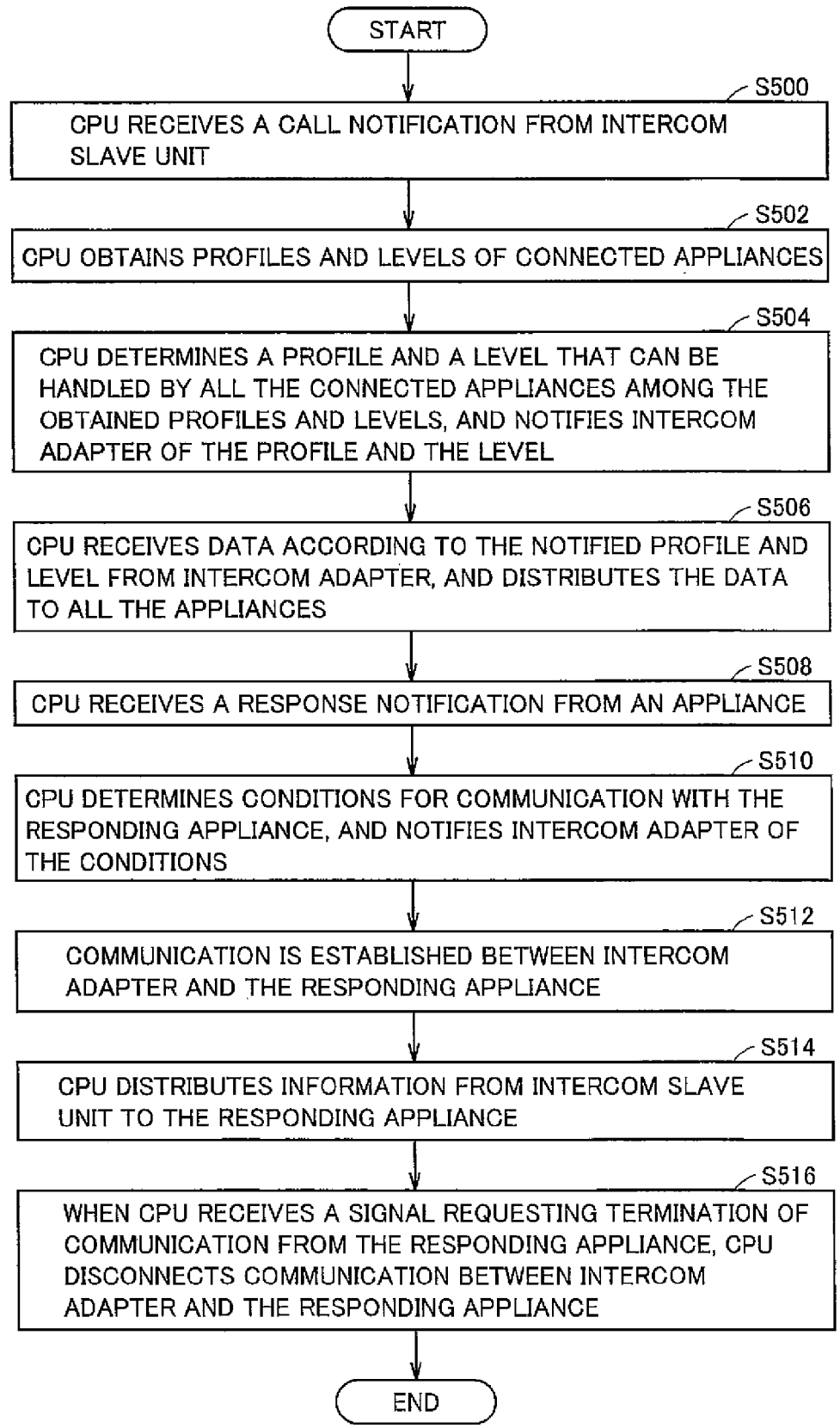
FIG. 7 is a flow chart illustrating a process of controlling information distribution processing in accordance with the first embodiment of the present invention.

Referring to FIG. 7, a program running on the communication system performs control for information distribution as described below.

At step S500 (hereinafter, the term "step" will be abbreviated as "S"), CPU 221 of home gateway 200 receives a call notification from intercom slave unit 100. Specific procedures for receiving a call notification will be described below. As the first procedure, call switch unit 104 of intercom slave unit 100 transmits a call notification to intercom adapter 110. As the second procedure, intercom adapter 110 transmits the call notification to intercom adapter interface 201 of home gateway 200. As the third procedure, audio circuit 203 extracts a signal of the call notification from a signal output by intercom adapter interface 201. As the fourth procedure, CPU 221 receives a signal output by audio circuit 203.

Figure 8:
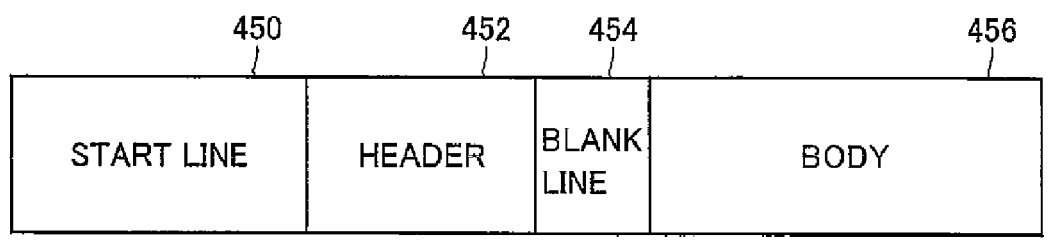
FIG. 8 shows a format of a packet transmitted from the home gateway in accordance with the first embodiment of the present invention to an appliance such as the intercom host unit.

At S502, CPU 221 obtains profiles and levels of the connected appliances (i.e., the "plurality of appliances" described above, although a powered-off appliance is disregarded). A profile refers to information that is a collection of encoding tools (elemental technologies) for executing an application. The profile also serves as information establishing a criterion for determining whether a decoder or a bit stream conforms to a standard. A level refers to information indicating performance capability required to decode an object type included in each profile. The level also serves as information determining resources such as an image size, the maximum bit rate, the maximum number of objects, the maximum VMV buffer size, the maximum VBV buffer size, and a VCV decoding bit rate. CPU 221 obtains the profiles and the levels of the appliances connected to home gateway 200, through specific procedures as described below. As the first procedure, CPU 221 causes line circuit 208, network interface 209, and wireless communication circuit 210, via communication control circuit 207, to individually transmit a signal for designating a destination and requesting connection to each of the plurality of appliances. As the second procedure, CPU 221 controls line circuit 208, network interface 209, and wireless communication circuit 210 to receive a profile and a level from each of the plurality of appliances described above. In the present embodiment, the appliance connected to home gateway 200 exchanges, with home gateway 200, information of a profile and a level described using Session Description Protocol (hereinafter referred to as "SDP") and contained in a body 456 of an SIP message described later. After the profiles and the levels are obtained, memory 222 stores the profile and the level received by line circuit 208, network interface 209, and wireless communication circuit 210, for each of the plurality of appliances described above, under the control of CPU 221. In the present embodiment, home gateway 200 communicates with each appliance according to the SIP (Session Initiation Protocol) protocol. FIG. 8 shows a format of an SIP message used in the SIP protocol between home gateway 200 and an appliance connected to home gateway 200. The SIP message is used together with a request or a response. A packet for requesting a profile and a level includes a start line 450, a header 452, a blank line 454, and body 456. Start line 450 includes information indicating whether the message is a request or a response. Header 452 includes information indicating a sender and a destination of the message. Blank line 454 includes information for separating header 452 from body 456. Body 456 includes: session information described in SDP, that is, information of a profile and a level; information necessary to distribute voice and a moving image such as information indicating a standard for compressing information of a moving image, information indicating an information transmission speed, information indicating the number of pixels per frame, and information indicating the number of lines per frame, information including the number of frames per second; and error information. In the present embodiment, MPEG-4 is employed as the standard for compressing information of a moving image.

At S504, CPU 221 determines a profile and a level that can be handled by all the appliances connected to home gateway 200, among the obtained profiles and levels (stored in memory 222), and notifies CPU 107 of intercom adapter 110 of information indicating the determined profile and level. FIG. 9 shows specific contents of the profiles and the levels stored in memory 222. In principle, a profile and a level have upward compatibility with another profile and another level. Thereby, CPU 221 can determine the profile and the level that can be handled by all the connected appliances.

At S506, notified CPU 107 of intercom adapter 110 controls video codec circuit 108 and audio codec circuit 109 such that, when they receive information from intercom slave unit 100, they convert image information received from intercom slave unit 100 into information that can be displayed in common on the plurality of appliances described above, using the profile and the level. Data output from video codec circuit 108 and audio codec circuit 109 are transmitted to home gateway 200 via gateway interface 106. Further, the data transmitted to home gateway 200 are transmitted to communication control circuit 207 via video circuit 202 and audio circuit 203. Communication control circuit 207 controls line circuit 208, network interface 209, and wireless communication circuit 210 to transmit the image information converted by video codec circuit 108 and audio codec circuit 109 to the plurality of appliances described above. Thereby, the information from intercom slave unit 100 is distributed to all the appliances, using the profile and the level determined at S504.

At S508, line circuit 208, network interface 209, and wireless communication circuit 210 receive a response notification from each of the appliances. The SIP message representing a response notification has the same format as that of the SIP message shown in FIG. 8.

At S510, CPU 221 controls line circuit 208, network interface 209, and wireless communication circuit 210 to newly obtain (receive) a profile and a level from an appliance that has transmitted a response (hereinafter referred to as a "responding appliance"). When the profile and the level are obtained, CPU 221 determines conditions for communication with the responding appliance. In the present embodiment, the conditions for communication determined at this step include a profile, a level, a transmission speed, the number of pixels per frame, the number of lines per frame, and the number of frames per second. CPU 221 determines the conditions for communication with the responding appliance such that information can be distributed under conditions most favorable to the responding appliance. When the conditions are determined, CPU 221 controls intercom adapter interface 201 to transmit the profile and level newly obtained from the responding appliance to intercom adapter 110. Thereby, the responding appliance can specify the profile and the like to intercom adapter 110.

At S512, intercom adapter 110 establishes communication with the responding appliance via home gateway 200.

At S514, since CPU 107 of intercom adapter 110 receives a response from at least one of the plurality of appliances described above, CPU 107 of intercom adapter 110 controls video codec circuit 108 or audio codec circuit 109 to convert the image information received from intercom slave unit 100 into information that can be displayed as an image on the responding appliance, using the profile and the level (in the present embodiment, using the profile and the level received by line circuit 208, network interface 209, and wireless communication circuit 210 in home gateway 200 after receiving a response from the responding appliance). Video codec circuit 108 or audio codec circuit 109 converts the information received from intercom slave unit 100 under the control of CPU 107. When the information is converted, the converted information is transmitted to home gateway 200 via gateway interface 106. Further, one of line circuit 208, network interface 209, and wireless communication circuit 210 within home gateway 200 distributes the information from intercom slave unit 100 to the responding appliance under the control of CPU 221, under communication conditions suitable to the distributing appliance. In the present embodiment, the information from intercom slave unit 100 is not distributed to an appliance other than the responding appliance. Thereby, when a response is transmitted from at least one of the plurality of appliances described above and then video codec circuit 108 or audio codec circuit 109 converts image information received from intercom slave unit 100, CPU 221 controls line circuit 208, network interface 209, and wireless communication circuit 210 to transmit the image information converted by video codec circuit 108 or audio codec circuit 109 to the responding appliance.

At S516, when line circuit 208, network interface 209, and wireless communication circuit 210 receive a signal informing that the information has been distributed and requesting termination of communication from intercom host unit 300, home gateway 200 disconnects communication with the responding appliance. Further, home gateway 200 notifies intercom adapter 110 that the communication has been terminated, and also disconnects communication with intercom adapter 110.

Figure 10:
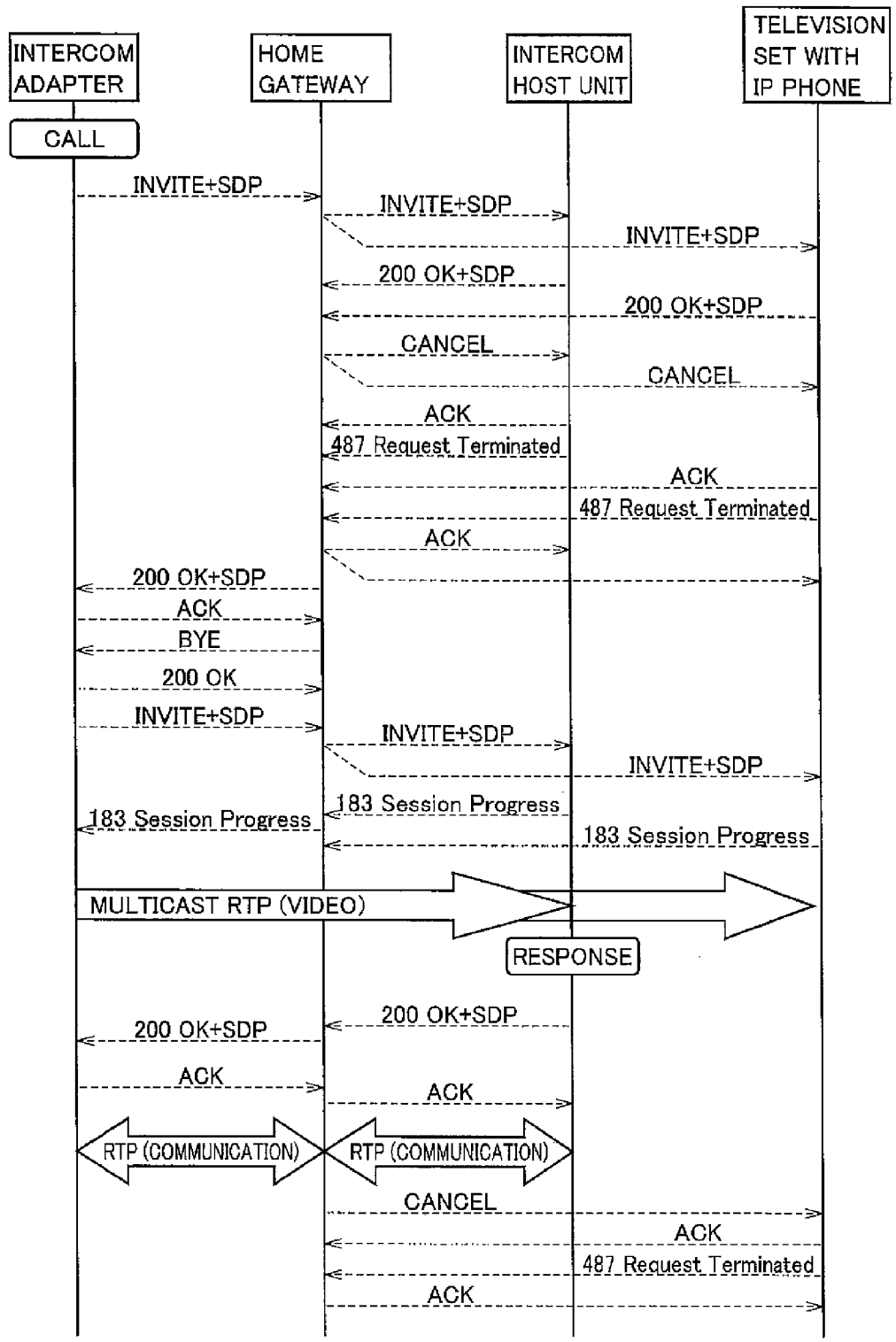
FIG. 10 is a sequence diagram showing flow of information in the communication system in accordance with the first embodiment of the present invention.

Referring to FIG. 10, an explanation will be given on an operation of the communication system based on the configuration and the flow chart as described above.

Home gateway 200 receives a call notification from intercom slave unit 100 (S500). From immediately after transmitting the call notification, intercom slave unit 100 continuously transmits information received by camera unit 101 and microphone unit 103. When home gateway 200 receives the call notification, CPU 221 obtains profiles and levels of intercom host unit 300 and television set with an IP phone 310 (S502). In the present embodiment, it is assumed that computer 320 is powered off and thus it does not transmit its profile and level. In the present embodiment, intercom host unit 300 automatically transmits its profile and level, and television set with an IP phone 310 transmits its profile and level when a user performs some operation. In FIG. 10, an operation performed until when a packet "200 OK+SDP" is received from intercom host unit 300 and television set with an IP phone 310 corresponds to these steps.

When the profiles and the levels are obtained, CPU 221 determines a profile and a level that can be handled by all the connected appliances (intercom host unit 300 and television set with an IP phone 310) among the obtained profiles and levels, and notifies intercom adapter 110 of the determined profile and level via intercom adapter interface 201 (S504). In parallel with the determination of the profile and the level, camera unit 101 of intercom slave unit 100 receives information representing an image of a visitor by taking the image, and transmits the received information to intercom adapter 110. In parallel with the determination of the profile and the level, microphone unit 103 of intercom slave unit 100 receives information representing voice of the visitor, and transmits the received information to intercom adapter 110. Demultiplexing circuit 105 of intercom adapter 110 demultiplexes the information received from camera unit 101 and the information received from microphone unit 103 of intercom slave unit 100. CPU 107 controls video codec circuit 108 and audio codec circuit 109 to convert the image information received from intercom slave unit 100 into information that can be displayed in common on the plurality of appliances described above. Video codec circuit 108 and audio codec circuit 109 transmit the converted information to gateway interface 106 using the profile and the level determined by CPU 221. Gateway interface 106 transmits the received information to intercom adapter interface 201. Line circuit 208, network interface 209, and wireless communication circuit 210 distribute the information from intercom slave unit 100 to all the appliances (S506). On this occasion, since computer 320 is powered off, it is regarded as not connected. In FIG. 10, an operation performed until when multicast is performed corresponds to these steps.

When the information is distributed, one of line circuit 208, network interface 209, and wireless communication circuit 210 receives a response notification from an appliance (S508). On this occasion, it is assumed that a response notification is received from intercom host unit 300. When the response notification is received, CPU 221 determines conditions for communication with the responding appliance (intercom host unit 300) (S510). In the present embodiment, since display unit 304 of intercom host unit 300 is small in size, the profile is set to "main" and the level is set to "L3". When the conditions for communication are determined, CPU 221 notifies intercom adapter 110 of the conditions for communication via intercom adapter interface 201. Notified intercom adapter 110 establishes communication with intercom host unit 300 via home gateway 200 (S512). In FIG. 10, an operation performed from when "RESPONSE" is indicated until when a packet "ACK" is transmitted from home gateway 200 to intercom host unit 300 corresponds to these steps.

When the communication is established, line circuit 208 distributes the information from intercom slave unit 100 to the responding appliance (intercom host unit 300), under the communication conditions suitable to intercom host unit 300 (S514). Thereby, the image taken by camera unit 101 of intercom slave unit 100 is displayed on display unit 304 of intercom host unit 300. When line circuit 208 receives a signal informing that the information has been distributed and requesting termination of communication from intercom host unit 300, line circuit 208 disconnects the communication (S516). In FIG. 10, an operation performed after when the packet "ACK" is transmitted from home gateway 200 to intercom host unit 300 corresponds to these steps.

As described above, the communication system in accordance with the present embodiment distributes an image to appliances connected thereto when it receives a call notification, as in the video intercom systems commercially available. To distribute the image, the home gateway of the communication system in accordance with the present embodiment receives a profile and a level from each of a plurality of appliances. When an appliance transmits a response notification after the distribution of the image, the home gateway performs processing for communicating with the responding appliance. The appliances connected to the home gateway may have different capabilities. Thereby, a variety of information having different levels and profiles can be distributed by multicast to the plurality of appliances, regardless of structures and performance capabilities of the appliances. To perform multicast distribution, a protocol for allowing one appliance to communicate with one appliance can be used. Conventionally, it has been difficult to use a protocol for allowing one appliance to communicate with one appliance to perform multicast distribution. For example, if RTP (Real-time Transport Protocol) multicast is used when SIP and RTP are simultaneously employed for communication, all the appliances should have the same profile and level. Therefore, since all the appliances should have the same profile and level, it was impossible to use RTP multicast in a system including an appliance with a different profile or level. If RTP unicast is used, an image can be distributed even in the system including an appliance with a different profile or level. In this case, however, it is necessary beforehand to communicate one-on-one with each appliance using SIP, obtain a profile and a level of each appliance, and prepare a codec circuit for each of the types of the obtained profiles and the like. An intercom adapter having a codec circuit for each of the connected appliances is expensive. The communication system in accordance with the present embodiment can accommodate a difference in profile or level most suitable to each of the connected appliances, and perform multicast distribution. Since the difference in profile or level is accommodated, the intercom adapter does not have to have a plurality of codec circuits. As a result, an intercom adapter, a home gateway, and a communication system capable of transmitting a variety of information regardless of structures and performance capabilities of appliances can be provided.

The protocol used for communication is not particularly limited as long as it can change an attribute of information to be communicated depending on a destination. For example, it may be H.323.

Further, at S502, CPU 221 may control line circuit 208, network interface 209, and wireless communication circuit 210 to receive the profiles and the levels from the plurality of appliances described above at a predetermined time (for example, at a time set by a designer of home gateway 200 beforehand).

Further, the conditions for communication at S510 may include a condition for a protocol. When the conditions for communication at S510 include a condition for a protocol, CPU 107 and CPU 221 use a protocol (for example, H.323) for communication, which is different from the protocol used for the communication up to S508 (SIP).

The communication system in accordance with the present embodiment may be a system different from a video intercom system. Examples of the system different from a video intercom system include duplex communication in wired broadcasting and broadband broadcasting, and a central management system in a production facility.

Further, home gateway 200 may communicate with a portable phone in addition to intercom host unit 300, television set with an IP phone 310, and computer 320, in the same way as in intercom host unit 300, television set with an IP phone 310, and computer 320. Home gateway 200 may communicate with a portable phone in place of one of intercom host unit 300, television set with an IP phone 310, and computer 320, in the same way as in one of intercom host unit 300, television set with an IP phone 310, and computer 320.

Further, at S504, CPU 221 may determine a profile and a level that can be handled by at least two of the appliances connected to home gateway 200, among the obtained profiles and levels. In this case, CPU 107 controls video codec circuit 108 or audio codec circuit 109 such that, when demultiplexing circuit 105 receives information from intercom slave unit 100, video codec circuit 108 or audio codec circuit 109 converts image information received from intercom slave unit 100 into information that can be displayed on the at least two of the plurality of appliances described above, using standard information. Thereby, a home gateway and a communication system capable of transmitting some degree of variety of information regardless of structures and performance capabilities of appliances can be provided.

Second Embodiment

In the following, a relay apparatus and a communication system in accordance with a second embodiment of the present invention will be described. The communication system in accordance with the present embodiment is a video intercom system allowing a resident to speak with a visitor while watching an image of the visitor.

Figure 11:
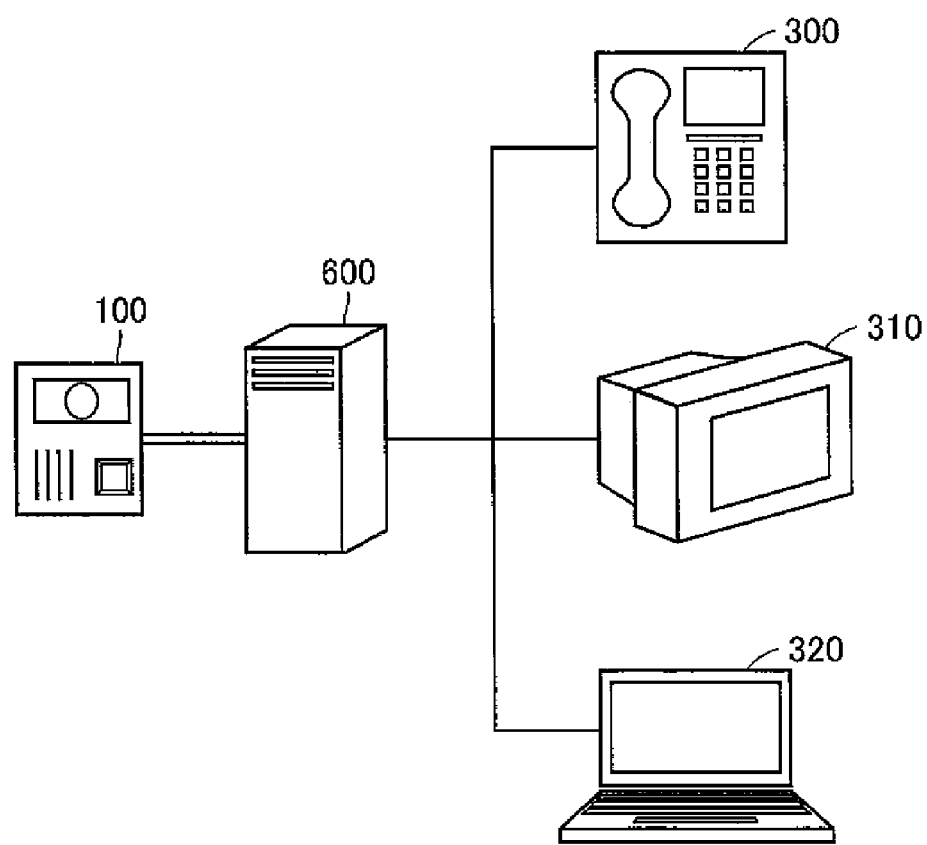
FIG. 11 shows a configuration of a communication system in accordance with a second embodiment of the present invention.

Referring to FIG. 11, the communication system in accordance with the present embodiment includes intercom slave unit 100, a home gateway 600, intercom host unit 300, television set with an IP phone 310, and computer 320.

Figure 12:
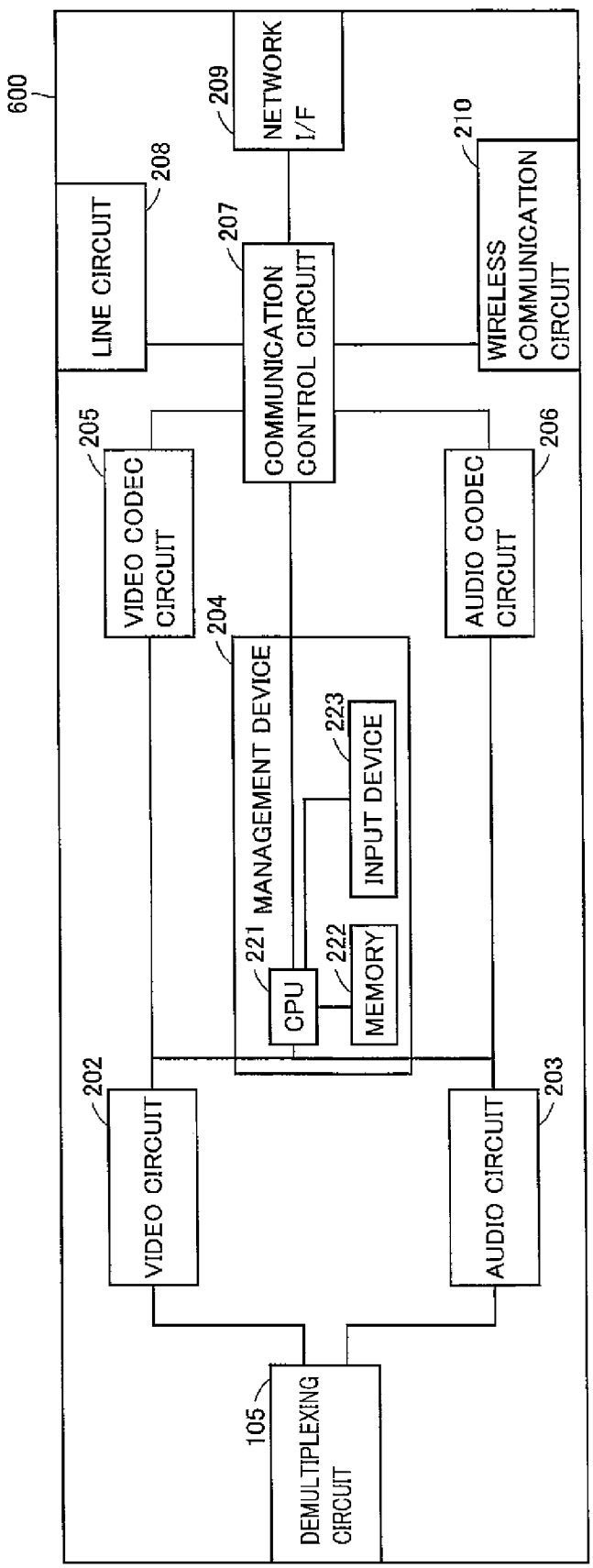
FIG. 12 is a control block diagram of a home gateway in accordance with the second embodiment of the present invention.

Referring to FIG. 12, home gateway 600 includes demultiplexing circuit 105, video circuit 202, audio circuit 203, management device 204, a video codec circuit 205, an audio codec circuit 206, communication control circuit 207, line circuit 208, network interface 209, and wireless communication circuit 210.

Other hardware components are the same as those in the first embodiment described above. Their functions are also the same as those in the first embodiment. Therefore, detailed description thereof will not be repeated here.

Figure 13:
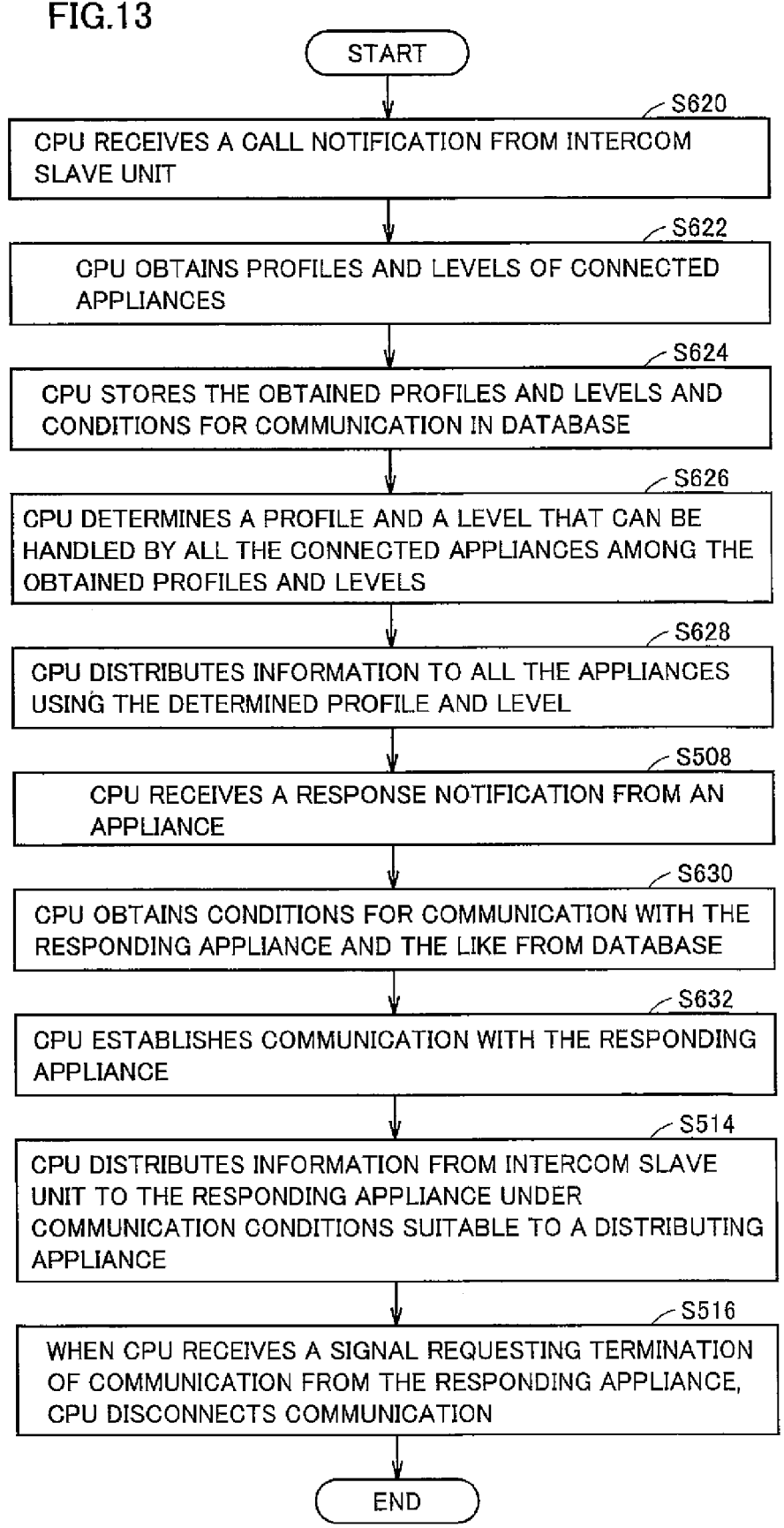
FIG. 13 is a flow chart illustrating a process of controlling information distribution processing in accordance with the second embodiment of the present invention.

Referring to FIG. 13, a program running on the communication system performs control for information distribution as described below. It is to be noted that, in the flow chart shown in FIG. 13, the steps already described in FIG. 7 are designated by the same step numbers. Since the steps are identical, detailed description thereof will not be repeated here.

At S620, CPU 221 of home gateway 600 receives a call notification from intercom slave unit 100. Specific procedures for receiving a call notification will be described below. As the first procedure, call switch unit 104 of intercom slave unit 100 outputs a call notification to demultiplexing circuit 105. As the second procedure, audio circuit 203 extracts a signal of the call notification from a signal output by demultiplexing circuit 105. As the third procedure, CPU 221 receives a signal output by audio circuit 203.

At S622, CPU 221 obtains profiles and levels of the connected appliances (i.e., intercom host unit 300, television set with an IP phone 310, and computer 320 in the present embodiment, although a powered-off appliance is disregarded). CPU 221 obtains the profiles and the levels of the appliances connected to home gateway 600, through specific procedures as described below. As the first procedure, CPU 221 causes line circuit 208, network interface 209, and wireless communication circuit 210, via communication control circuit 207, to individually transmit a signal for designating a destination and requesting connection to each of the plurality of appliances described above. As the second procedure, CPU 221 controls line circuit 208, network interface 209, and wireless communication circuit 210 to receive profiles and levels from the plurality of appliances described above after demultiplexing circuit 105 receives information from intercom slave unit 100. In the present embodiment, the appliance connected to home gateway 600 exchanges, with home gateway 600, information described according to SDP, using SIP protocol. The format of an SIP message transmitted and received by home gateway 600 to exchange a profile and a level with each of the appliances connected to home gateway 600 is the same as that in the first embodiment.

At S624, CPU 221 stores the obtained profiles and levels and conditions for communication in a database of memory 222. Thereby, memory 222 stores a plurality of profiles and levels received by line circuit 208, network interface 209, and wireless communication circuit 210, for each of the plurality of appliances described above.

At S626, CPU 221 determines a profile and a level that can be handled by all the appliances connected to home gateway 600, among the obtained profiles and levels.

At S628, CPU 221 controls video codec circuit 205 and audio codec circuit 206 such that, when demultiplexing circuit 105 receives information from intercom slave unit 100, video codec circuit 205 and audio codec circuit 206 convert image information received from intercom slave unit 100 into information that can be displayed in common on the plurality of appliances described above, using the profile and the level. When the image information received from intercom slave unit 100 is converted into the information that can be displayed in common on the plurality of appliances described above, communication control circuit 207 controls line circuit 208, network interface 209, and wireless communication circuit 210 to transmit the converted information to the plurality of appliances described above. Thereby, the information from intercom slave unit 100 is distributed to all the appliances, using the profile and the level determined at S626.

At S630, CPU 221 obtains conditions for communication with a responding appliance (an appliance that has transmitted a response notification) and the like from the database stored in memory 222.

At S632, home gateway 600 establishes communication with the responding appliance.

Figure 14:
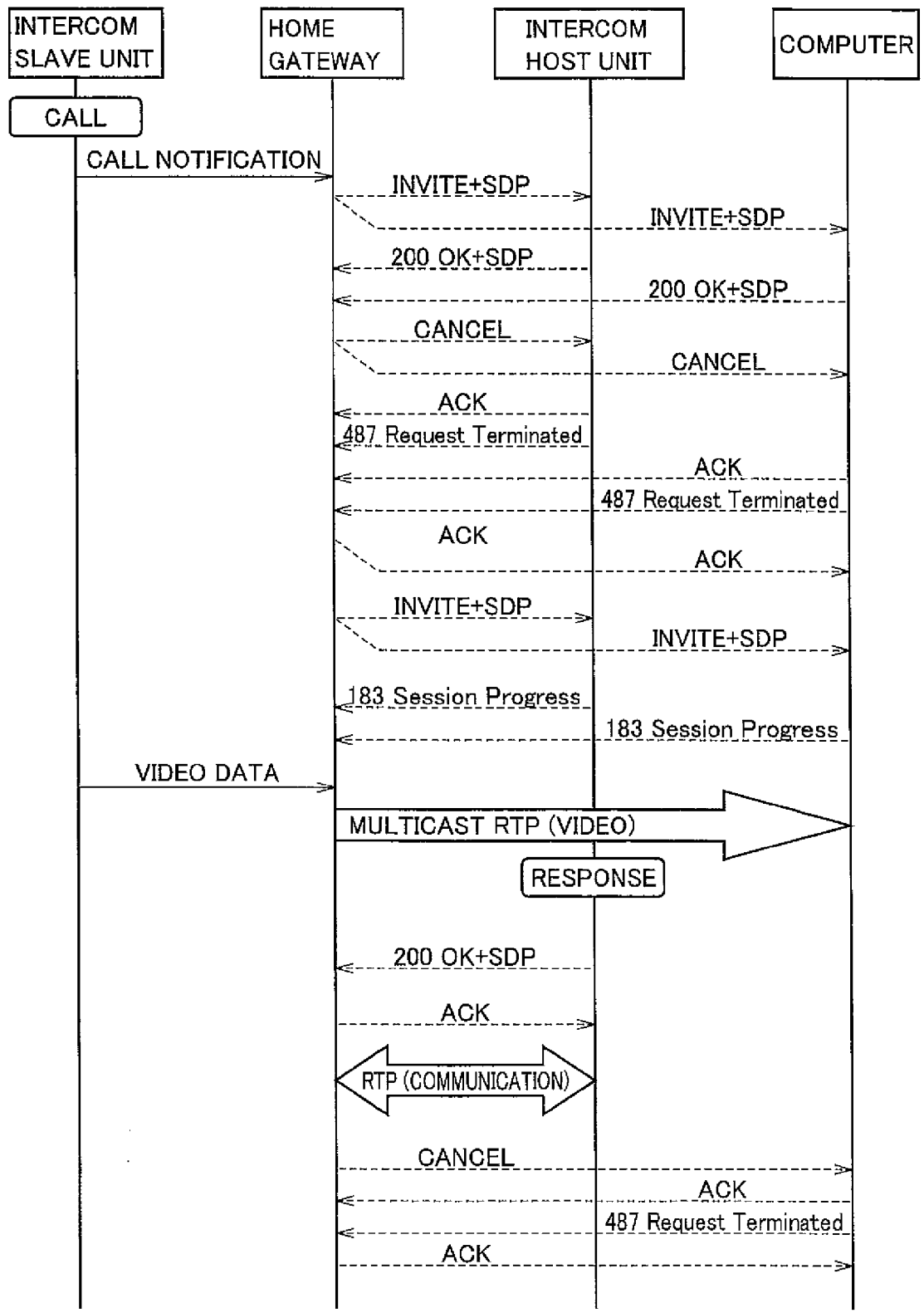
FIG. 14 is a sequence diagram showing flow of information in the communication system in accordance with the second embodiment of the present invention.

Referring to FIG. 14, an explanation will be given on an operation of the communication system based on the configuration and the flow chart as described above. In the present embodiment, CPU 221 of home gateway 600 disregards television set with an IP phone 310, because television set with an IP phone 310 is powered off.

CPU 221 of home gateway 600 receives a call notification from intercom slave unit 100 (S620). When the call notification is received, CPU 221 obtains profiles and levels of the connected appliances (in the present embodiment, intercom host unit 300 and computer 320) (S622). When the profiles and the levels are obtained, CPU 221 stores the obtained profiles and levels and conditions for communication in the database of memory 222 (S624). When the profiles and the like are stored, CPU 221 determines a profile and a level that can be handled by all the connected appliances (intercom host unit 300 and computer 320) among the obtained profiles and levels (S626). In parallel with the determination of the profile and the level, camera unit 101 of intercom slave unit 100 receives information representing an image of a visitor by taking the image, and transmits the received information to intercom adapter 110. In parallel with the determination of the profile and the level, microphone unit 103 of intercom slave unit 100 receives information representing voice of the visitor, and transmits the received information to home gateway 600. Demultiplexing circuit 105 of home gateway 600 demultiplexes the information received from camera unit 101 and the information received from microphone unit 103 of intercom slave unit 100, controls video codec circuit 205 and audio codec circuit 206, and distributes the information to all the appliances via communication control circuit 207, using the determined profile and level (S628). After the operation goes through S508, CPU 221 obtains conditions for communication with a responding appliance and the like from the database in memory 222 (S630).

When the conditions for communication are obtained, CPU 221 establishes communication with the responding appliance (S632). Communication control circuit 207 distributes the information from intercom slave unit 100 to the responding appliance, under the communication conditions suitable to the responding appliance (S514). Thereby, when a response is transmitted at least one of the plurality of appliances described above, CPU 221 controls video codec circuit 205 to convert the image information received from intercom slave unit 100 into information that can be displayed as an image on the responding appliance, using the profile and the level of the responding appliance among the profiles and the levels stored in memory 222.

As described above, the communication system in accordance with the present embodiment can distribute information based on a profile, a level, and conditions for communication stored in the database, under the conditions for communication suitable to a responding appliance. Thereby, a variety of information can be transmitted regardless of structures and performance capabilities of appliances. As a result, a home gateway and a communication system capable of transmitting a variety of information regardless of structures and performance capabilities of appliances can be provided.

The communication system in accordance with the present embodiment may be a system different from a video intercom system. Examples of the system different from a video intercom system include duplex communication in wired broadcasting and broadband broadcasting, and a central management system in a production facility.

Further, at S628, information may be distributed to all the appliances according to predetermined profile and level. In this case, the profile and the level used for distributing information at S628 should be predetermined such that they can be received by all the appliances connectable to home gateway 600. If information is distributed to all the appliances according to predetermined profile and level, S626 is unnecessary.

Third Embodiment

In the following, a relay apparatus and a communication system in accordance with a third embodiment of the present invention will be described. The communication system in accordance with the present embodiment is a video intercom system allowing a resident to speak with a visitor while watching an image of the visitor.

The communication system in accordance with the present embodiment has hardware components identical to those in the first embodiment described above. Their functions are also the same as those in the first embodiment. Therefore, detailed description thereof will not be repeated here.

Figure 15:
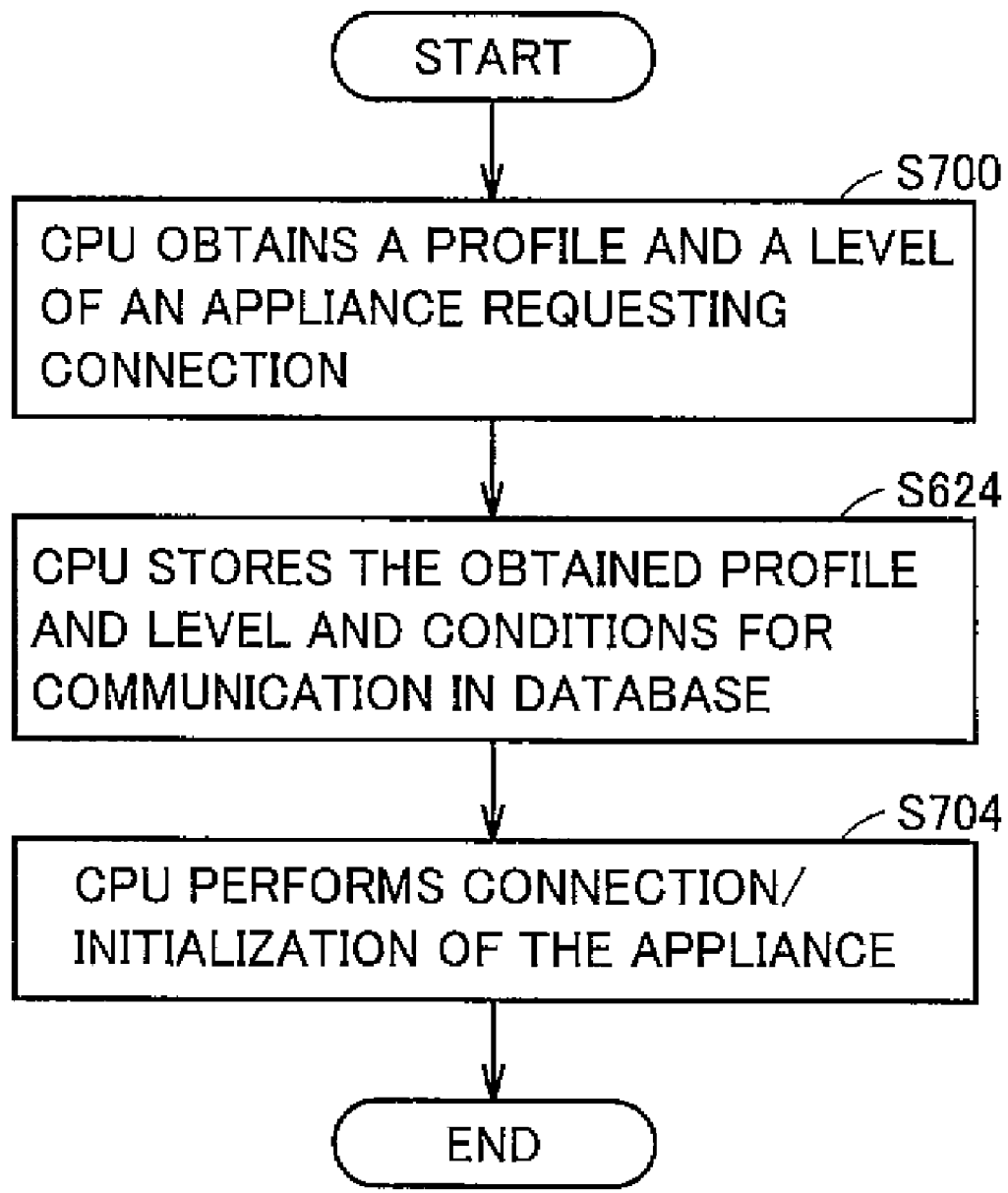
FIG. 15 is a flow chart illustrating a process of controlling a home gateway in accordance with a third embodiment of the present invention to obtain profiles and levels.

Referring to FIG. 15, a program running on the communication system performs control for information distribution as described below. It is to be noted that, in the flow chart shown in FIG. 15, the steps already described in FIG. 13 are designated by the same step numbers. Since the steps are identical, detailed description thereof will not be repeated here.

At S700, CPU 221 of home gateway 200 obtains a profile and a level of an appliance requesting connection, CPU 221 obtains profiles and levels of appliances connected to home gateway 200, through specific procedures as described below. As the first procedure, CPU 221 causes line circuit 208, network interface 209, and wireless communication circuit 210, via communication control circuit 207, to transmit a signal indicating to provide connection to an appliance requesting connection. As the second procedure, CPU 221 controls line circuit 208, network interface 209, and wireless communication circuit 210 to receive a profile and a level from the appliance requesting connection. By repeating the first and second procedures, CPU 221 controls line circuit 208, network interface 209, and wireless communication circuit 210 to receive profiles and levels from the plurality of appliances described above before intercom adapter interface 201 receives information from intercom slave unit 100 (in the present embodiment, when communication with the appliance requesting connection is performed for the first time). At S704, CPU 221 performs connection and initialization of the appliance. Since specific contents of initialization have been well known, detailed description thereof will not be repeated here.

Figure 16:
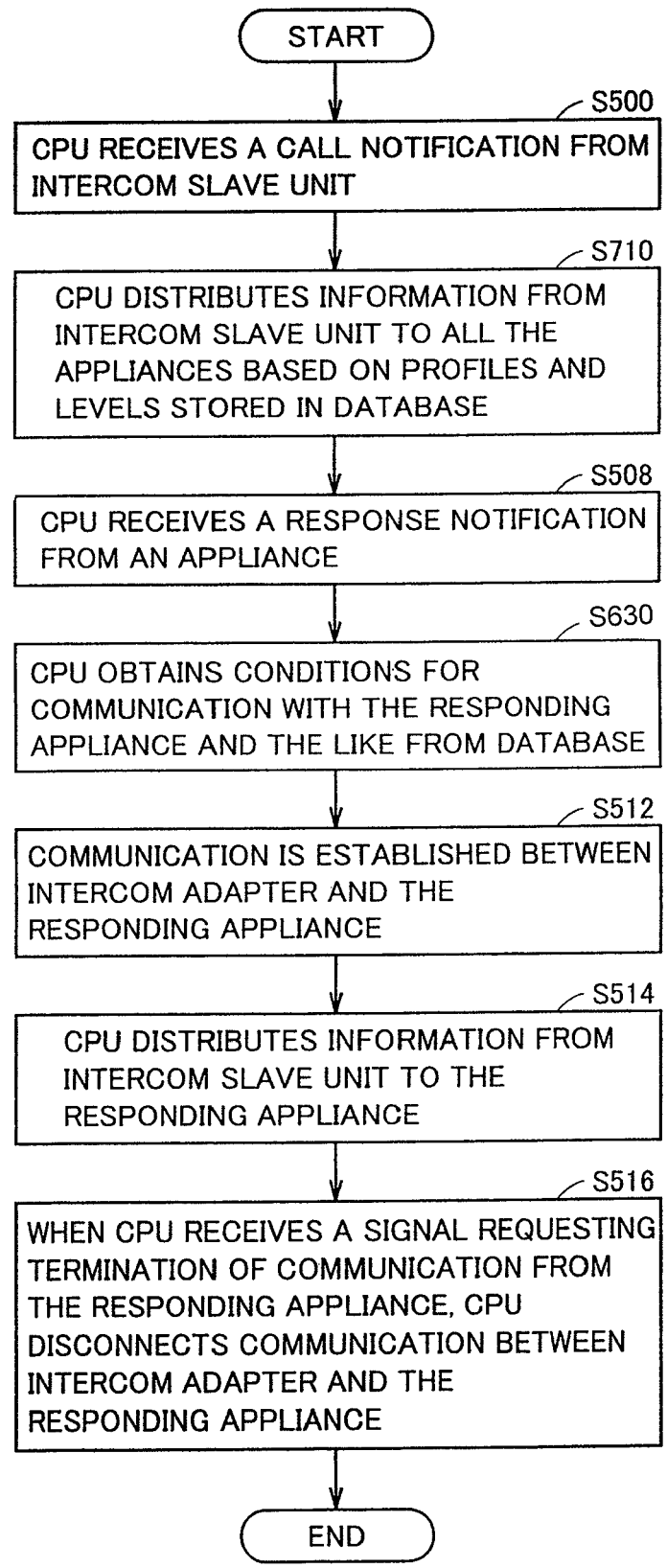
FIG. 16 is a flow chart illustrating a process of controlling information distribution processing in accordance with the third embodiment of the present invention.

Referring to FIG. 16, a program running on the communication system performs control for information distribution processing as described below.

In the flow chart shown in FIG. 16, the steps already described in FIGS. 7 and 13 are designated by the same step numbers. Since the steps are identical, detailed description thereof will not be repeated here.

At S710, CPU 221 distributes information from intercom slave unit 100 to all the appliances based on profiles and levels stored in memory 222.

Figure 17:
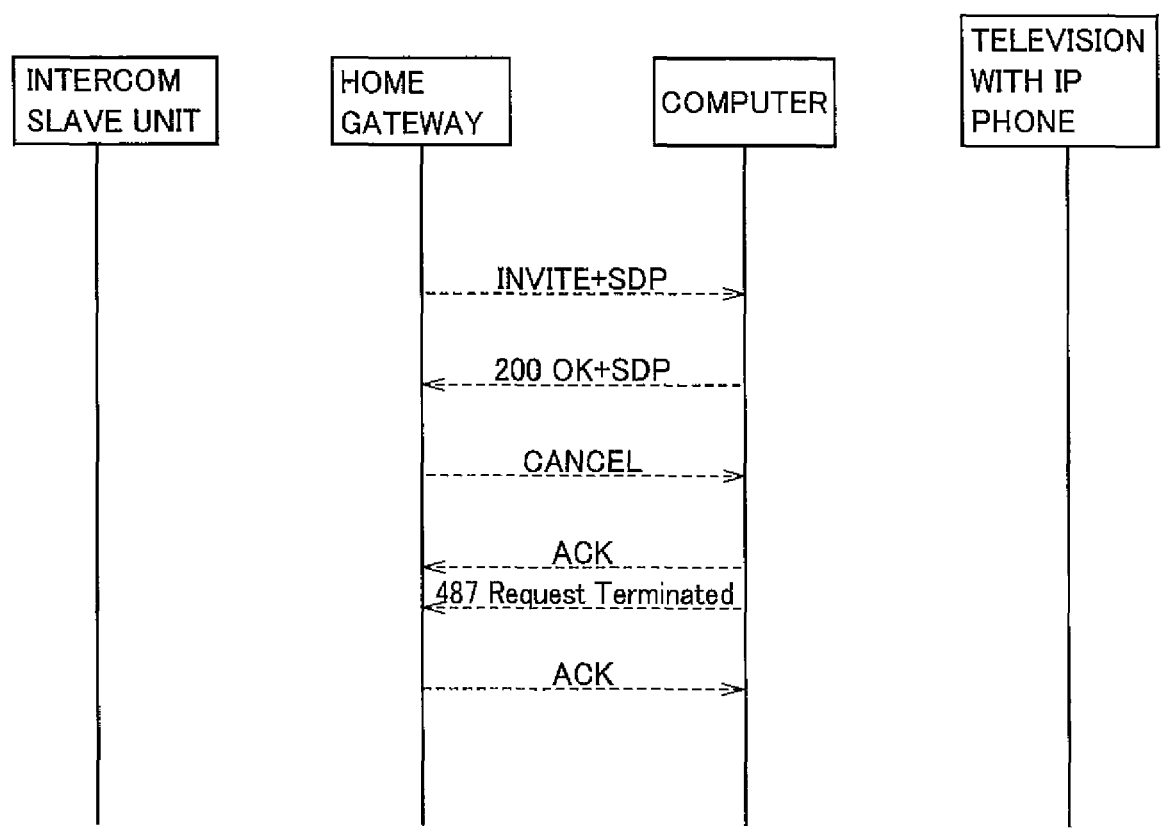
FIG. 17 is a sequence diagram showing flow of information in the communication system in accordance with the third embodiment of the present invention.

Referring to FIG. 17, an explanation will be given on an operation of the communication system based on the configuration and the flow chart as described above.

In the present embodiment, it is assumed that computer 320 is newly to be connected. In response to a signal from computer 320 requesting connection, CPU 221 obtains a profile and a level of an appliance requesting connection (computer 320) (S700). When the profile and the level are obtained, the operation goes through S624, and CPU 221 performs connection and initialization of the appliance (computer 320) (S704). When initialization and the like are performed, the operation goes through S500, and CPU 221 distributes information from intercom slave unit 100 to all the appliances (in the present embodiment, CPU 221 disregards intercom host unit 300 because intercom host unit 300 is powered off), based on the profiles and levels stored in the database of memory 222 (S710).

As described above, when an appliance is newly to be connected, the home gateway in accordance with the present embodiment obtains a profile and a level of the appliance requesting connection. Thereby, a variety of information can be transmitted regardless of structures and performance capabilities of appliances. As a result, a home gateway and a communication system capable of transmitting a variety of information regardless of structures and performance capabilities of appliances can be provided.

The communication system in accordance with the present embodiment may be a system different from a video intercom system. Examples of the system different from a video intercom system include duplex communication in wired broadcasting and broadband broadcasting, and a central management system in a production facility.

The embodiments disclosed herein are by way of example in all respects and should not be interpreted as restrictive. The scope of the present invention is determined not by the above description but by the appended claims, and intended to include all the modifications within the meaning and the scope equivalent to those of the claims.

INDUSTRIAL APPLICABILITY

As has been described, according to the present invention, a variety of information can be transmitted regardless of structures and performance capabilities of appliances. Therefore, the present invention can be applied advantageously in an industry involved in such as manufacturing an appliance transmitting information, and in an industry utilizing the transmitted information.

The invention claimed is:

1. A relay apparatus transmitting information received from a first appliance having a communication function to a plurality of second appliances each having a communication function, the relay apparatus comprising:
    a first communication circuit receiving the information from said first appliance;
    a second communication circuit communicating with said plurality of second appliances;

a storage device storing standard information indicating a standard for an image that can be displayed on each of said plurality of second appliances, for each of said plurality of second appliances;

a conversion circuit converting image information received from said first appliance according to the standard for the image; and a control device controlling said second communication circuit and said conversion circuit, wherein said control device includes a first controller configured to control said conversion circuit such that, when said first communication circuit receives the information from said first appliance, said conversion circuit converts the image information received from said first appliance into information that can be displayed in common on said plurality of second appliances, using said standard information, a second controller configured to control said second communication circuit such that, when said conversion circuit converts the image information received from said first appliance into the information that can be displayed in common on said plurality of second appliances, said second communication circuit transmits the image information converted by said conversion circuit to said plurality of second appliances, a third controller configured to control said conversion circuit, when a response to the image information transmitted from the second communication circuit is transmitted from at least one of said plurality of second appliances, to determine an image format optimum for reproduction capability of the at least one second appliance that has transmitted the response, and to convert the image information received from said first appliance into the determined image format using said standard information, and a fourth controller configured to control said second communication circuit such that, when said conversion circuit converts the image information received from said first appliance after the response is transmitted from the at least one of said plurality of second appliances, said second communication circuit transmits the image information converted by said conversion circuit to the at least one second appliance that has transmitted said response.

2. The relay apparatus according to claim 1, wherein said storage device includes a device storing size information indicating a size of the image that can be displayed, as said standard information, for each of said plurality of second appliances, said conversion circuit includes a circuit converting the image information received from said first appliance to change the size of the image, and the third controller is further configured to control said conversion circuit such that, when a response is transmitted from at least one of said plurality of second appliances, said conversion circuit converts the image information received from said first appliance into information that can be displayed as an image on the at least one second appliance that has transmitted the response, using said size information.

3. The relay apparatus according to claim 1, wherein said storage device includes a device storing code information indicating a method of encoding an image to be displayed, as said standard information, for each of said plurality of second appliances, said conversion circuit includes a circuit converting the image information received from said first appliance to encode the image, and the third controller is further configured to control said conversion circuit such that, when a response is transmitted from at least one of said plurality of second appliances, said conversion circuit converts the image information received from said first appliance into information that can be displayed as an image on the at least one second appliance that has transmitted the response, using said code information.

4. The relay apparatus according to claim 1, wherein said control device further includes a fifth controller configured to control said second communication circuit to receive said standard information from said plurality of second appliances, said storage device includes a device storing the standard information received by said second communication circuit, for each of said plurality of second appliances, and the third controller is further configured to control said conversion circuit such that, when a response is transmitted from at least one of said plurality of second appliances, said conversion circuit converts the image information received from said first appliance into information that can be displayed as an image on the at least one second appliance that has transmitted said response, using the standard information received by said second communication circuit after the response is transmitted from the at least one second appliance that has transmitted said response.

5. The relay apparatus according to claim 4, wherein the fifth controller is further configured to control said second communication circuit to receive said standard information from each of said plurality of second appliances.

6. The relay apparatus according to claim 1, wherein said control device further includes a controller configured to control said second communication circuit to receive said standard information from said plurality of second appliances only after said first communication circuit receives the information from said first appliance, said storage device includes a device storing the standard information received by said second communication circuit, for each of said plurality of second appliances, and the third controller is further configured to control said conversion circuit such that, when a response is transmitted from at least one of said plurality of second appliances, said conversion circuit converts the image information received from said first appliance into information that can be displayed as an image on the at least one second appliance that has transmitted said response, using the standard information of said at least one second appliance that has transmitted the response in the standard information stored in said storage device.

7. The relay apparatus according to claim 1, wherein said control device further includes a controller configured to control said second communication circuit to receive said standard information from said plurality of second appliances only before said first communication circuit receives the information from said first appliance, said storage device includes a device storing the standard information received by said second communication circuit, for each of said plurality of second appliances, and the third controller is further configured to control said conversion circuit such that, when a response is transmitted from at least one of said plurality of second appliances, said conversion circuit converts the image information received from said first appliance into information that can be displayed as an image on the at least one second appliance that has transmitted said response, using the standard information of said at least one second appliance that has transmitted the response in the standard information stored in said storage device.

8. A communication system, comprising:
a first appliance;
a relay apparatus; and
a plurality of second appliances, wherein
said first appliance includes
   a reception device receiving information representing one of an image and voice, and
   a transmission circuit transmitting the information received by said reception device,
said relay apparatus includes
   a first communication circuit configured to receive the information from said first appliance,
   a second communication circuit configured to communicate with said plurality of second appliances,
   a storage device configured to store standard information indicating a standard for an image that can be displayed, for each of said plurality of second appliances,
   a conversion circuit configured to convert image information received from said first appliance according to the standard for the image, and
   a control device configured to control said second communication circuit and said conversion circuit, said control device including
      a first controller configured to control said conversion circuit such that, when said first communication circuit receives the information from said first appliance, said conversion circuit converts the image information received from said first appliance into information that can be displayed in common on said plurality of second appliances, using said standard information,
      a second controller configured to control said second communication circuit such that, when said conversion circuit converts the image information received from said first appliance into the information that can be displayed in common on said plurality of second appliances, said second communication circuit transmits the image information converted by said conversion circuit to said plurality of second appliances,
      a third controller configured to control said conversion circuit, when a response to the image information transmitted from the second communication circuit is transmitted from at least one of said plurality of second appliances, to determine an image format optimum for reproduction capability of the at least one second appliance that has transmitted the response, and to convert the image information received from said first appliance into the determined image format using said standard information, and
      a fourth controller configured to control said second communication circuit such that, when said conversion circuit converts the image information received from said first appliance after the response is transmitted from the at least one of said plurality of second appliances, said second communication circuit transmits the image information converted by said conversion circuit to the at least one second appliance that has transmitted said response, and
each of said plurality of second appliances includes
   a communication device communicating with said relay apparatus,
   a control device controlling said communication device to transmit information for the response to said relay apparatus, and
   an output device outputting the information received from said relay apparatus.

9. A method of relaying information from a first appliance having a communication function to a plurality of second appliances having a communication function, the method comprising:
storing in a memory standard information indicating a standard for an image that can be displayed for each of the plurality of second appliances;
receiving image information from the first appliance;
retrieving from the memory a common standard in which all of the plurality of second appliances are able to display an image;
converting the image information into first converted image information according to the common standard;
transmitting the first converted image information to the plurality of the second appliances;
receiving a response to said transmitting the first converted image from at least one second device of the plurality of the second appliances;
selecting a standard optimum for reproduction capability of the at least one second appliance that sent the response;
converting the image information into second converted image information based on the selected standard; and
transmitting the second converted image information to the at least one second appliances that sent the response.

10. The method according to claim 9, further comprising:
receiving from the plurality of second appliances standard information indicating the standard for an image that can be displayed for each of the plurality of second appliances, only before receiving the image information from the first appliance.

11. The method according to claim 9, further comprising:
receiving from the plurality of second appliances standard information indicating the standard for an image that can be displayed for each of the plurality of second appliances, only after receiving the image information from the first appliance.

* * * * *